United States Patent [19]
Wheatley et al.

[11] Patent Number: 5,233,465
[45] Date of Patent: Aug. 3, 1993

[54] VISIBLY TRANSPARENT INFRARED REFLECTING FILM WITH COLOR MASKING

[75] Inventors: John A. Wheatley; Walter J. Schrenk, both of Midland, Mich.

[73] Assignee: The Dow Chemical Company, Midland, Mich.

[21] Appl. No.: 888,705

[22] Filed: May 27, 1992

[51] Int. Cl.$^5$ .............................................. G02B 5/28
[52] U.S. Cl. .................................... 359/359; 359/589; 359/588; 428/30
[58] Field of Search ................. 428/30, 212, 213, 215, 428/220, 409, 411.1, 204, 206, 332, 916, 913.3, 688, 500, 515; 359/588, 589, 359

[56] References Cited

U.S. PATENT DOCUMENTS

| | | | |
|---|---|---|---|
| 3,247,392 | 4/1966 | Thelen | 250/226 |
| 3,432,225 | 3/1969 | Rock | 359/588 |
| 3,711,176 | 1/1973 | Alfrey, Jr. | 359/359 |
| 3,972,590 | 8/1976 | Gelber | 350/160 |
| 4,971,843 | 11/1990 | Michelotti | 428/34 |
| 5,084,356 | 1/1992 | Deak | 428/458 |
| 5,103,337 | 4/1992 | Schrenk | 359/359 |

OTHER PUBLICATIONS

Radford et al., "Reflectivity of Iridescent Coextruded Multilayered Plastic Films," Polymer Engineering and Science, vol. 13, No. 3, May 1973.

M. Ohmer, "Design of Three-Layer Equivalent Films," J. Optical Soc. of Am., vol. 68(1), pp. 137-139 (1978).

Primary Examiner—Patrick J. Ryan
Assistant Examiner—Cathy K. Lee

[57] ABSTRACT

A polymeric multilayered film which reflects wavelengths of light in the infrared region of the spectrum while being substantially transparent to wavelengths of light in the visible spectrum without the effects of visibly perceived iridescent color is provided. The polymeric multilayered infrared reflecting film comprises at least two diverse, substantially transparent polymeric materials, with the layers having an optical thickness of between 0.09 μm and 0.45 μm and the polymeric materials having a different index of refraction such that light is reflected in the infrared portion of the spectrum. A color masking film is associated with the polymeric film which reflects light substantially uniformly over the visible portion of the spectrum to eliminate perceived iridescent color.

20 Claims, 2 Drawing Sheets

VISIBLY TRANSPARENT INFRARED REFLECTING FILM WITH COLOR MASKING

BACKGROUND OF THE INVENTION

The present invention relates to multilayered infrared reflecting films, and more particularly to polymeric multilayered films which reflect light in the infrared region of the spectrum while transmitting light at substantially all wavelengths in the visible spectrum with an absence of visibly perceived iridescent color.

Coextruded multilayer infrared reflecting films have been made which comprise multiple alternating layers of two polymers with individual layer thicknesses of 300 nanometers or less. Such multilayer films are described, for example, in Alfrey et al, U.S. Pat. No. 3,711,176. When polymers are selected to have a sufficient mismatch in refractive indices, these multilayer films cause constructive interference of light. This results in the film transmitting certain wavelengths of light through the film while reflecting other wavelengths. The multilayer films can be fabricated from relatively inexpensive and commercially available polymer resins having the desired refractive index differences.

The reflection and transmission spectra for a particular film are primarily dependent on the optical thickness of the individual layers, where optical thickness is defined as the product of the actual thickness of the layer times its refractive index. Films can be designed to reflect infrared, visible, or ultraviolet wavelengths of light depending on the optical thickness of the layers. When designed to reflect infrared wavelengths of light, such prior art films also exhibit higher order reflections in the visible range, resulting in an iridescent appearance for the films. The films produced in accordance with the above mentioned Alfrey patent exhibit iridescence and changing colors as the angle of incident light on the film is changed.

For some applications, while reflection of infrared wavelengths is desirable, higher order reflections of visible light are not. For example, infrared reflecting films can be laminated to glass in buildings and automobiles to reduce air conditioning loads. The films may also be laminated to other substantially transparent plastic materials to reflect infrared wavelengths. However, the films must be substantially transparent to visible light so that the vision of those looking through the glass or plastic is not impaired.

It is possible to suppress some higher order reflections in the visible range of the spectrum by proper selection of the optical thickness ratio in two component multilayer films. See, Radford et al, "Reflectivity of Iridescent Coextruded Multilayered Plastic Films," *Polymer Engineering and Science*. vol. 13, No. 3, May 1973. However, it is not possible to suppress two successive higher order reflections with two component films alone unless somewhat complex three-layer equivalent films (two component films which simulate three components) are used. See, M. Ohmer, "Design of Three-Layer Equivalent Films", *J. Optical Soc. of Am.*, v.68(1), pp. 137-139 (1978).

Schrenk et al, in commonly assigned U.S. Pat. No 5,103,337, teach a three component infrared reflecting film which transmits a majority of visible light. The three component film is capable of suppressing three higher order reflections so that the film appears substantially colorless. However, due to the nature of reflective interference films, the film may still display localized non-uniform spots of iridescent color due to thickness variations or problems with control during the coextrusion process.

Other workers have designed optical coatings comprising layers of three or more metal oxides and halides which are able to suppress certain higher order reflections in the visible spectrum. For example, Thelen, U.S. Pat. No. 3,247,392, describes an optical coating used as a band pass filter reflecting in the infrared and ultraviolet regions of the spectrum. The coating is taught to suppress second and third order reflectance bands. However, the materials used in the fabrication of the coating are metal oxide and halide dielectric materials which must be deposited using complex vacuum deposition techniques. Also, once deposited, the coatings and the substrates to which they are adhered cannot be further shaped or formed without destroying the integrity of the coatings.

Michelotti et al, U.S. Pat. No. 4,971,843, describes a tin or other metal oxide film which is deposited on one surface of a glass sheet and which is of a thickness to produce an infrared reflective effect. However, due to second or higher order effects, the infrared reflecting film also exhibits iridescent color in the visible range. To mask the iridescent color, the patentees teach that a second metal oxide coating is deposited on an opposite surface of the glass which is uniformly reflective over the visible range. However, the use of metal oxide films involves complex deposition procedures to produce the desired products, and further, Michelotti et al require an intervening sheet of glass for the films to adhere to. The Michelotti films cannot be retrofitted onto existing structures.

Wheatley et al, in commonly-assigned copending application Ser. No. 07/629,520, filed Dec. 18, 1990, and entitled "Polymeric Reflective Bodies with Multiple Layer Types", now U.S. Pat. No. 5,126,880, issued Jun. 30, 1992, describes a uniformly reflective all polymer body in which the iridescent effects from optically thin layers are masked. However, the body is not designed to be transparent to visible light.

Accordingly, the need still exists in this art for a multilayered film which reflects light in the infrared region of the spectrum, while transmitting light in the visible region of the spectrum which has substantially no visibly perceived iridescent color, and which is easily produced.

SUMMARY OF THE INVENTION

The present invention meets that need by providing a polymeric multilayered film made up of multiple alternating layers of diverse polymers which reflects wavelengths of light in the infrared region of the spectrum while being substantially transparent to wavelengths of light in the visible spectrum. Through the use of a broad-band reflective multilayer polymeric film or a suitable broad-band reflective metal oxide or halide coating in combination with the infrared-reflecting film, the film is also capable of masking iridescent color reflected from the infrared-reflecting layers. By the term "diverse" we mean that the polymeric materials need not differ in any respect except in terms of refractive index. Thus, while adjacent layers may be chemically diverse, if such materials have the same refractive index, then for purposes of the present invention they are not "diverse". The number of layers may vary within a wide range of from about 50 to over 1000 layers.

In accordance with a preferred embodiment of the invention, a substantially colorless polymeric multilayered film is provided having at least two major surfaces and which reflects light in the infrared region of the spectrum while transmitting light in the visible region of the spectrum. Preferably, at least 50%, and most preferably at least 70%, of the light in the visible region of the spectrum is transmitted through the film. In an alternative embodiment of the invention, the film also reflects light in the ultraviolet region of the spectrum.

The film preferably comprises multiple alternating layers of at least two diverse, substantially transparent polymeric materials, with the layers having an optical thickness of between about 0.09 $\mu$m and 0.45 $\mu$m and each of the polymeric materials having a different index of refraction such that the layers reflect light in the infrared portion of the spectrum. Preferably, the substantially transparent polymeric materials differ from each other in refractive index by at least about 0.03.

In one embodiment of the invention, the polymeric multilayered film includes first, second and third diverse polymeric materials of alternating layers having a repeating pattern ABCB. In accordance with one of the preferred embodiments, the first polymeric material is polystyrene, the second polymeric material is a copolymer of styrene and methyl methacrylate, and the third polymeric material is polymethyl methacrylate.

In another embodiment of the invention, the film includes first and second polymeric materials of alternating layers having a repeating pattern ABAB where the first polymeric material comprises polystyrene and the second polymeric material comprises polymethylmethacrylate.

To produce a film which reflects a broad bandwidth of wavelengths in the solar infrared range (e.g., reflection of wavelengths of from about 0.7 to 2.0 $\mu$m), a layer thickness gradient may be introduced across the thickness of the film. Thus, in one embodiment of the invention, the layer thicknesses will increase monotonically across the thickness of the film. By monotonically, it is meant that the layer thicknesses increase at a predetermined rate across the thickness of the film. See, Schrenk, U.S. Pat. No. 3,687,589.

Means are also associated with the film for masking any iridescent visible color reflected from the layers so that there is an absence of visibly perceived color reflected from the film. By "masking", it is meant that means are provided to reflect and/or refract light to interfere with the observance of iridescent visible color. In one embodiment of the invention, the color masking means comprises a masking film which reflects light substantially uniformly over the visible portion of the spectrum. The masking film comprises a sufficient number of alternating layers of substantially transparent diverse first and second polymeric materials having optical thicknesses of not less than 0.45 $\mu$m of not greater than 0.09 $\mu$m or not less than 0.45 $\mu$m. In a preferred embodiment of the invention, the alternating layers of polymeric materials comprise polycarbonate and polymethylmethacrylate.

The color masking film may be located on one or both of the major surfaces of the polymeric film or between interior layers of the film. Preferably, the color masking film is laminated to the polymeric film. Alternatively, it may be coextruded therewith.

In another embodiment of the invention, the color masking means comprises a substantially colorless metal oxide or metal halide film having sufficient broad band reflectance in the visible range to mask the iridescent color effects of the infrared reflecting film. In this embodiment of the invention, the metal oxide or halide film is preferably deposited on the film by conventional coating techniques such as pyrolysis, powder coating, chemical vapor deposition, vacuum coating, or cathode sputtering. The metal oxide or halide film may be located on one or both of the major surfaces of the polymeric film or between interior layers of the film. A preferred metal oxide film is tin oxide.

Accordingly, it is an object of the present invention to provide a substantially colorless polymeric multilayered film which reflects light in the infrared region of the spectrum while transmitting a substantial portion of light in the visible region of the spectrum and which masks iridescent color so that there is essentially no visibly perceived color reflected from the film. These, and other objects and advantages of the present invention, will become apparent from the following detailed description, the accompanying drawings, and the appended claims.

DETAILED DESCRIPTION OF THE PREFERRED EMBODIMENTS

The present invention provides polymeric multilayered films with a number of desirable properties including infrared reflectivity, substantial transparency to visible light, and the capability to mask iridescent color from the films so that there is an absence of perceived color reflected from the film.

The polymeric multilayered film has at least two major surfaces and comprises multiple alternating layers of at least two diverse, substantially transparent polymeric materials, with the layers having an optical thickness of between about 0.09 $\mu$m and 0.45 $\mu$m (optically thin layers) and each of the polymeric materials having a different index of refraction such that the layers reflect light in the infrared portion of the spectrum. Preferably, the transparent polymeric materials differ from each other in refractive index by at least about 0.03. In addition, at least 50%, and preferably at least 70% of the light in the visible region of the spectrum is transmitted through the film.

While the preferred embodiment of the invention is directed to an infrared reflecting film, the film may also be constructed to reflect light in the ultraviolet region of the spectrum. The capability of reflecting ultraviolet light is useful in many applications.

In one of the preferred embodiments of the invention, the polymeric multilayered film includes first, second and third diverse polymeric materials of alternating layers having a repeating pattern ABCB where the first polymeric material is polystyrene, the second polymeric material is a copolymer of styrene and methyl methacrylate, and the third polymeric material is polymethyl methacrylate.

Figure 3:
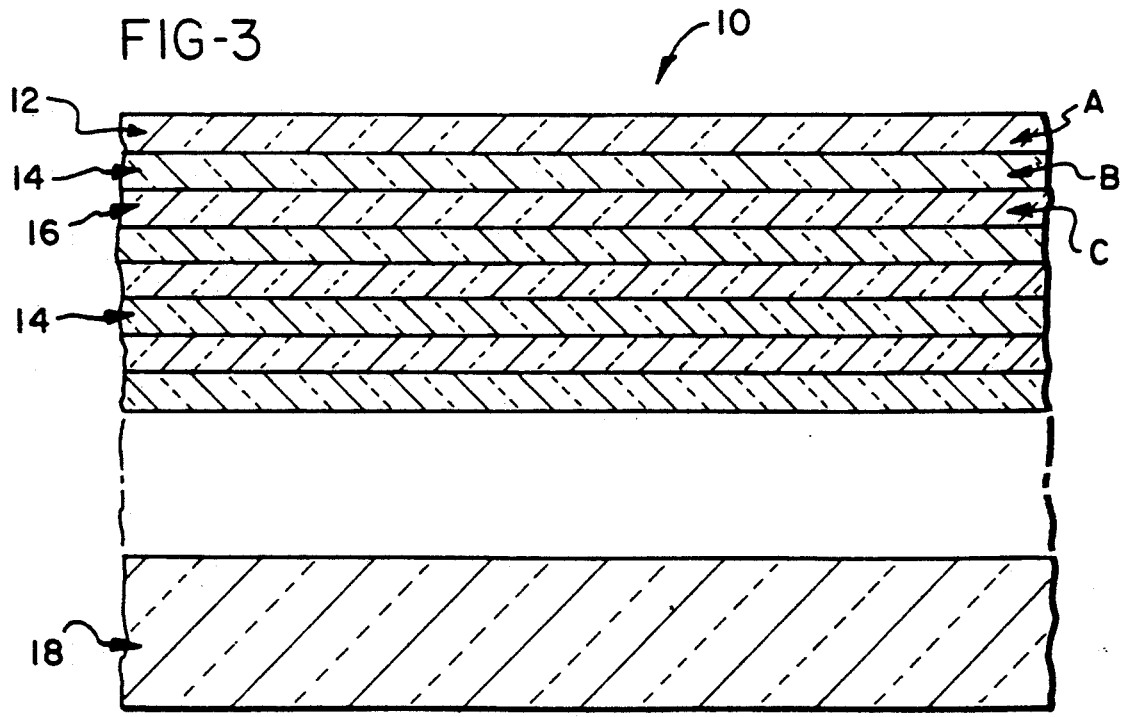
FIG. 3 is a schematic cross-section of a preferred three component polymeric multilayered film of the present invention laminated to the color masking film of the present invention.

The preferred three component multilayer film is shown schematically in FIG. 3 as a repeating unit ABCB. The film 10 includes polymer layers 12, 14 and 16, respectively of polymers A, B, and C.

Additionally, the refractive index of the second polymeric material is preferably intermediate the respective refractive indices of the first and third polymeric materials. The optical thickness of a given layer may be defined as the physical thickness, d, times the refractive index, $n_i$, of the polymeric material. The optical thickness ratio of a material, $f_i$, may be defined as:

$$f_i = \frac{n_i d_i}{\sum_{i=1}^{m} (n_i d_i)}$$

where m is the number of layers in the optical repeat unit, $n_i$ is the refractive index of polymers i, and $d_i$ is the layer thickness of polymers i.

Thus, for a three component film having a repeating unit ABCB, the optical thickness ratio of material A, $f_A$, is ⅓, the optical thickness ratio of material B, $f_B$, is 1/6, and the optical thickness ratio or material C, $f_C$, is ⅓. See Schrenk et al, U.S. Pat. No. 5,103,337, the disclosure of which is incorporated herein by reference. For this embodiment of the invention, there is an intense reflection at the first order wavelength, while the reflections at the second, third, and fourth order wavelengths are suppressed.

To produce a film which reflects a broad bandwidth of wavelengths in the solar infrared range (e.g., reflection at from about 0.7 to 2.0 μm), a layer thickness gradient may be introduced across the thickness of the film. Thus, in one embodiment of the invention, the layer thicknesses will increase monotonically across the thickness of the film. By "monotonically", it is meant that each layer will consistently increase in thickness with respect to the preceding layer at a predetermined rate.

In another embodiment of the invention, the film includes first and second polymeric materials of alternating layers having a repeating pattern ABAB where the first polymeric material comprises polystyrene and the second polymeric material comprises polymethylmethacrylate. As taught by the above-mentioned Radford et al article, by controlling the optical thickness ratios in a two-component system, different order reflections may be enhanced while others are suppressed. However, it is not possible to suppress multiple successive higher order reflections in a two component multilayer polymer system without resorting to a relatively complex layer synthesis design. Thus, a two component multilayer film designed to reflect strongly the near infrared region of the spectrum will exhibit unwanted reflectivity in the visual region of the spectrum as well because of such higher order reflections. Likewise, even with suppression of higher order reflections, three-component films may still exhibit non-uniform spots of color due to thickness variations in the film and process control problems during extrusion.

However, the present invention provides a color masking film which is associated with the polymeric multilayered film to mask any iridescent visible color reflected from the layers so that there is an absence of visibly perceived color reflected from the film.

The color masking means comprises a masking film which reflects light substantially uniformly over the visible portion of the spectrum. The masking film comprises a sufficient number of alternating layers of substantially transparent diverse polymeric materials having broad band reflectance across the visible spectrum which is sufficient to mask perceived iridescent color. The layers in the masking film may comprise optically thick layers, combinations of optically thick and optically very thin layers, and optically thin layers and combinations of optically thin and optically thick layers where the layer thicknesses of the optically thin layers in the stack have been varied to produce broad band visible reflectance. In a preferred embodiment of the invention, the alternating layers of polymeric materials comprise polycarbonate and polymethylmethacrylate.

While the masking film may be associated with either two- or three-component films, it should be appreciated that the three-component film which suppresses the second through fourth order reflections will not require as many alternating layers of masking film as the two-component film described above, which does not suppress higher order visible reflections.

The overall effect of the combination of the polymeric multilayered film with the color masking film is dependent on the relationship between the baseline reflectance and the peak reflectance. The perception factor, $P_f$, is a measure of how the eye perceives changes in the reflectance of the multilayer film. The perception factor is defined by the equation $P_f=(A-B)/B$, where A represents the peak reflectance from the polymeric film, and B represents the baseline reflectance from the polymeric film. By peak reflectance, we mean the highest value for reflectance which is measured within the wavelength range of interest. By baseline reflectance, we mean the average reflectance on either side of the peak wavelength band. Generally, the wavelength range of interest is the visible spectrum. It has been determined that for a $P_f$ value of 0.5 or less, substantially no iridescent interference color is perceived by an observer. For $P_f$ values of greater than 0.5, iridescent color can be observed. See Wheatley et al, U.S. Pat. No.5,126,880 the disclosure of which is hereby incorporated by reference.

The use of the color masking film in association with the polymeric multilayered film causes the baseline reflectance in the visible range to be raised to result in a $P_f$ value of less than 0.5 which substantially masks any iridescent color.

The color masking film may be located on one or both of the major surfaces of the infrared reflecting polymeric film or between interior layers of the film. As shown in FIG. 3, the color masking film 18 is preferably laminated to the polymeric film. Alternatively, the color masking layers may be coextruded with the infrared reflective layers.

In another embodiment of the invention, the color masking means comprises a substantially colorless metal oxide or metal halide film having sufficient reflectance to mask the visible iridescent color effects of the infrared reflecting film. In this embodiment of the invention, the metal oxide or halide film is preferably deposited on the infrared reflecting film by conventional coating techniques such as pyrolysis, powder coating, chemical vapor deposition, vacuum coating, or cathode sputtering. The metal oxide or halide film may be located on one or both of the major surfaces of the film or between interior layers of the film. A preferred metal oxide is tin oxide.

Preferred polymeric materials for use in the polymeric multilayered film of the present invention include homopolymers and copolymers of styrene and methyl methacrylate. For example, the first polymeric material may be polystyrene, the second polymeric material may be a copolymer of styrene and methyl methacrylate, and the third polymeric material may be polymethyl methacrylate. Copolymers of the above and other polymers are also useful in the practice of the present invention and include, for example, copolymers of styrene and methyl methacrylate, styrene and acrylonitrile, and styrene and butadiene. Other copolymers include copolycarbonates of 4,4-thiodiphenol and bisphenol A and copolymers of gluterimide and methyl methacrylate (KAMAX resins, available from Rohm and Haas).

Alternatively, miscible blends of polymers may be used to form any of the polymeric materials by mixing them in the correct proportions for the desired refractive index. Examples of suitable miscible blends include polymethyl methacrylate and polyvinylidene fluoride as well as miscible blends of polycarbonates with: copolymers of polyvinyl chloride and polyvinylidene chloride (Saran, available from the Dow Chemical Company), polyesters and copolyesters polycaprolactones, poly (ethylene succinate), poly (ethylene adipate), poly (1,4-butylene adipate), poly 1,4-cyclohexanedimethylene succinate), and a copolymer based on 1,4-cyclohexanedimethylene terephthalate (PCTG).

Other suitable thermoplastic resins which may find use in the practice of the present invention, along with representative refractive indices, include, but are not limited to: perfluoroalkoxy resins (refractive index=1.35), polytetrafluoroethylene (1.35), fluorinated ethylene-propylene copolymers (1.34), silicone resins (1.41), polyvinylidene fluoride (1.42), polychlorotrifluoroethylene (1.42), epoxy resins (1.45), poly(butyl acrylate) (1.46), poly(4-methylpentene-1) (1.46), poly(vinyl acetate) (1.47), ethyl cellulose (1.47), polymethyl acrylate (1.48), polypropyl methacrylate (1.48), polyethyl methacrylate (1.48), polyether block amide (1.49), polymethyl methacrylate (1.49), cellulose acetate (1.49), cellulose propionate (1.49), polyvinyl butyral (1.49), polypropylene (1.49), polybutylene (1.50), ionomeric resins such as Surlyn (trademark) (1.51), low density polyethylene (1.51), polyacrylonitrile (1.51), polyisobutylene (1.51), thermoplastic polyesters such as Ecdel (trademark) (1.52), natural rubber (1.52), perbuanan (1.52), polybutadiene (1.52), nylon (1.53), polyacrylic imides (1.53), poly(vinyl chloro acetate) (1.54), polyvinyl chloride (1.54), high density polyethylene (1.54) copolymers of methyl methacrylate and styrene (1.54), transparent acrylonitrile-butadiene-styrene terpolymer (1.54), allyl diglycol resin (1.55), blends of polyvinylidene chloride and polyvinyl chloride such as Saran resins (trademark (1.55), polyalpha-methyl styrene (1.56), styrene-butadiene latexes such as Dow 512-K (trademark) (1.56), polyurethane (1.56), neoprene (1.56), copolymers of styrene and acrylonitrile such as Tyril resin (trademark) (1.57), copolymers of styrene and butadiene (1.57), polycarbonate (1.59), other thermoplastic polyesters such as polyethylene terephthalate and polyethylene terephthalate glycol (1.60), polystyrene (1.60), polyimide (1.61), polyvinylidene chloride (1.61), polydichlorostyrene (1.62), polysulfone (1.63), polyether sulfone (1.65), and polyetherimide (1.66). Other polymers, and their respective refractive indices, are reported in J. Brandrup and E. Immergut, *Polymer Handbook*. Third Edition, pp. VI-451-VI461.

It is preferred that the polymers have compatible rheologies for coextrusion. That is, as a preferred method of forming the multilayer films is the use of coextrusion techniques, the melt viscosities of the polymers must be reasonably matched to prevent layer instability or nonuniformity. The polymers used also should have sufficient interfacial adhesion so that the films will not delaminate.

Multilayer films in accordance with the present invention are most advantageously prepared by employing a multilayered coextrusion device as described in U.S. Pat. Nos. 3,773,882 and 3,884,606 the disclosures of which are incorporated herein by reference. Such a device provides a method for preparing multilayered, simultaneously extruded thermoplastic materials, each of which are of a substantially uniform layer thickness.

The feedblock of the coextrusion device receives streams of the diverse thermoplastic polymeric materials from a source such as a heat plastifying extruder. The streams of resinous materials are passed to a mechanical manipulating section within the feedblock. This section serves to rearrange the original streams into a multilayered stream having the number of layers desired in the film. Optionally, this multilayered stream may be subsequently passed through a series of layer multiplying means in order to further increase the number of layers in the film.

The multilayered stream is then passed into an extrusion die which is so constructed and arranged that streamlined flow is maintained therein. Such an extrusion device is described in U.S. Pat. No. 3,557,265, the disclosure of which is incorporated by reference herein. The resultant product is extruded to form a multilayered film in which each layer is generally parallel to the major surface of adjacent layers.

The configuration of the extrusion die can vary and can be such as to reduce the thickness and dimensions of each of the layers. The precise degree of reduction in thickness of the layers delivered from the mechanical orienting section, the configuration of the die, and the amount of mechanical working of the film after extrusion are all factors which affect the thickness of the individual layers in the final film. It should be appreciated that the polymeric multilayered film and the color masking film may be extruded separately and then laminated together or may be coextruded together.

The polymeric multilayered films of the present invention may find a number of uses in areas where infrared reflective properties are desired. For example, the films of the present invention may be used as glazing material. The films of the present invention may also be laminated to glass used in buildings and automobiles to reflect infrared radiation, thus lowering the heating loads. Further, the films may be laminated to other substantially transparent plastics to provide infrared reflective properties. For example, windshields and canopies on certain aircraft are fabricated from tough polymeric resins. Laminating the multilayered film of the present invention to, or incorporating the film into, such polymeric resins would provide protection from infrared radiation while still providing substantial transparency to light in the visible region of the spectrum.

Because the polymeric infrared reflective multilayered films are associated with the color masking film, no iridescence or other undesirable color effects are perceived. The polymeric multilayered film also provide a number of advantages over prior art films in that they are easier to produce because the ability to mask iridescent color in the films allows looser control of layer thickness and simplifies processing. Further, the films of the present invention may be readily retrofitted onto existing structures or incorporated into new structures.

In order that the invention may be more readily understood, reference is made to the following example, which is intended to be illustrative of the invention, but is not intended to be limiting in scope.

EXAMPLE

Employing apparatus as generally described in U.S Pat. Nos. 3,773,882 and 3,759,647, incorporated herein by reference, a three-component, 657 layer film was made which reflected in the infrared region of the spectrum while maintaining visible transparency. The coextruded film consisted of an ABCB repeat pattern of the following three polymeric components: component A, styrene methyl methacrylate commercially available from the Richardson Polymer Corporation under the designation P-359; component B, a methyl methacrylate styrene copolymer commercially available from the Richardson Polymer Corporation under the designation RPC-440-70; and component C, polymethyl methacrylate commercially available from Rohm and Haas under the designation VS-100.

Figure 1:
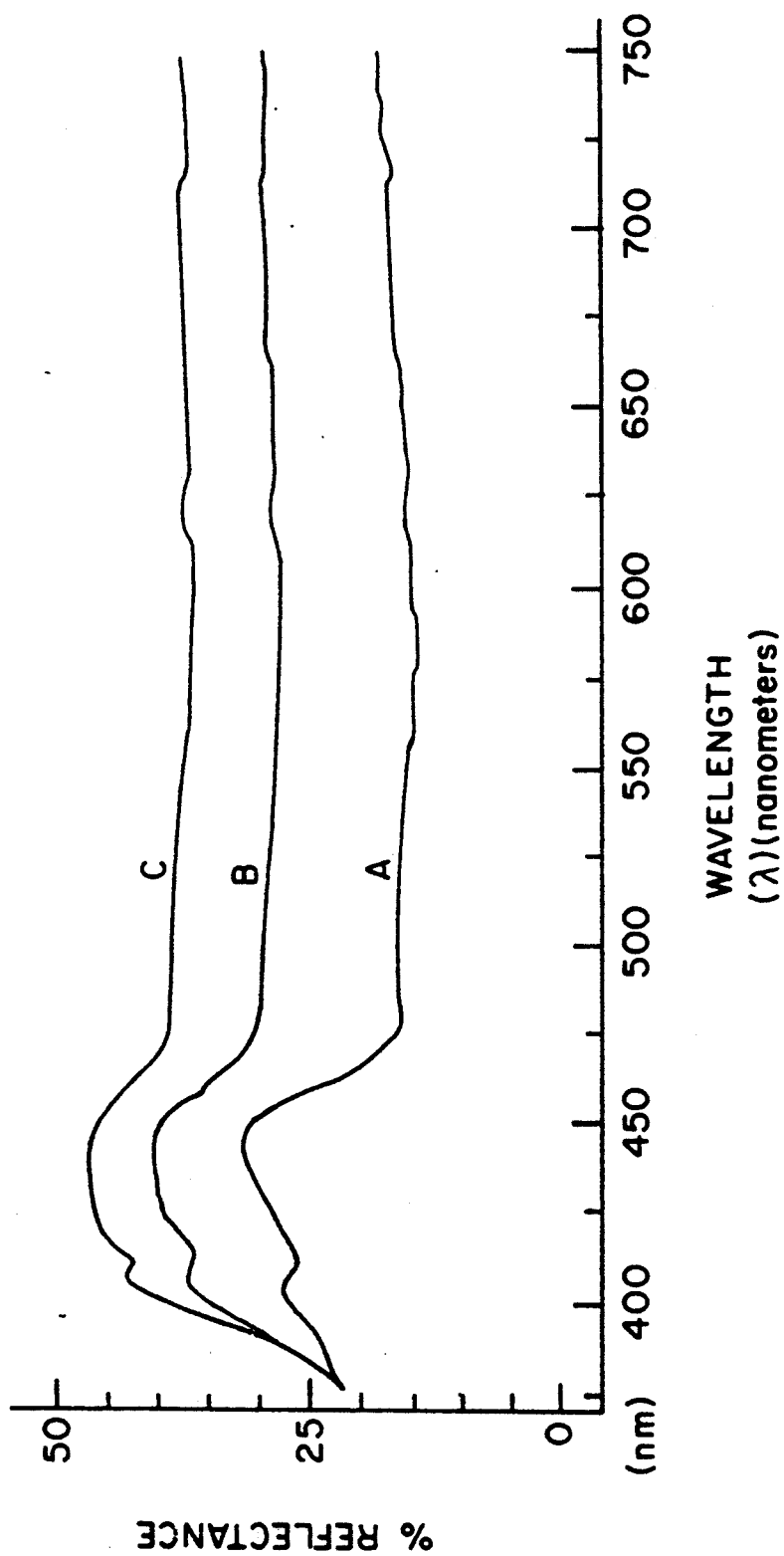
FIG. 1 is a graph illustrating the reflectance of optically thick layers placed behind the infrared reflecting film prepared in accordance with Example 1.
Figure 2:
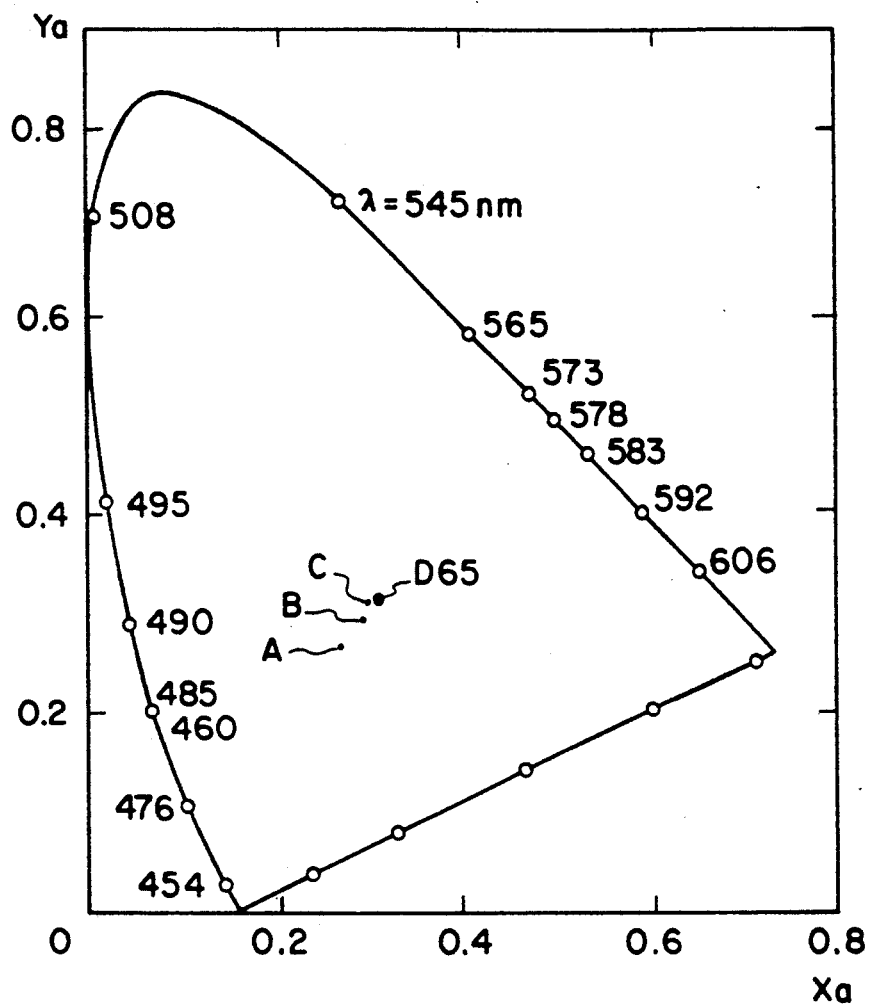
FIG. 2 is a graph illustrating the color location for each of the reflecting spectra shown in FIG. 1.

The optical thickness ratios used for the film were $\frac{1}{3}$, 1/6, $\frac{1}{3}$, 1/6 as taught in Schrenk et al, U.S. Pat. No. 5,103,337, incorporated herein by reference. This step achieved suppression of second through fourth order reflections. However, the film sample obtained exhibited non-uniform spots of iridescent color. The reflection spectrum for the film sample is shown as "A" in FIG. 1. To reduce the amount of color seen in reflection, a low intensity broad band reflector consisting of 165 alternating optically thick layers of polycarbonate and poly(methyl methacrylate) was placed behind the 657 layer film. The resulting reflection spectrum "B" is shown in FIG. 1. A total of 330 alternating layers of polycarbonate and polymethyl methacrylate was then placed behind the 657 layer sample. The resulting reflection spectrum "C" is shown in FIG. 1. FIG. 2 illustrates a plot of color location for each of the three spectra shown in FIG. 1. The graph of FIG. 2 represents CIE 1931 tristimulus color space, where the point labeled D65 represents complete absence of color. See, R. S. Hunter, *The Measurement of Appearance* (1987). The further a point is away from D65, the more intense the observed color is. For example, a point on the curve plotted in FIG. 2 at 545 nm wavelength will exhibit an intense yellow-green color. Other points at different wavelengths will exhibit intense colors corresponding to the wavelength of light. As shown in FIG. 2, the placement of low intensity broad band reflectors behind the 657 layer film reduced the transparency of the film to about 70% and eliminated the objectionable color.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A substantially colorless polymeric multilayered film having at least two major surfaces and which reflects a majority of light in the infrared region of the spectrum while transmitting a majority of light in the visible region of the spectrum comprising, multiple alternating layers of at least two diverse, substantially transparent polymeric materials which differ in refractive index by at least about 0.03, said layers having an optical thickness of between about 0.09 $\mu$m and 0.45 $\mu$m and each of said polymeric materials having a different index of refraction such that said film reflects light in the infrared portion of the spectrum, and means associated with said film for masking any iridescent visible color reflected from said layers such that there is an absence of visibly perceived color reflected from said film, said color masking means comprise a sufficient number of alternating layers of substantially transparent diverse polymeric materials, a substantial majority of said layers having an optical thickness of not less than 0.45 $\mu$m or not greater than 0.09 $\mu$m.

2. The substantially colorless polymeric multilayered film of claim 1 wherein said film reflects light in the ultraviolet region of the spectrum.

3. The substantially colorless multilayered film of claim 1 in which said film includes first (A), second (B), and third (C) diverse polymeric materials of alternating layers having a repeating pattern ABCB.

4. The substantially colorless polymeric multilayered film of claim 3 in which said first polymeric material is polystyrene, said second polymeric material is a copolymer of styrene and methyl methacrylate, and said third polymeric material is polymethyl methacrylate.

5. The substantially colorless polymeric multilayered film of claim 3 in which said first polymeric material is polycarbonate, said second polymeric material is a copolymer of styrene and methyl methacrylate, and said third polymeric material is polymethyl methacrylate.

6. The substantially colorless multilayered film of claim 1 in which said film includes first (A) and second (B) polymeric materials of alternating layers having a repeating pattern ABAB.

7. The substantially colorless polymeric multilayered film of claim 6 in which said first polymeric material is polystyrene and said second polymeric material is polymethylmethacrylate.

8. The substantially colorless polymeric multilayered film of claim 1 wherein said color masking means comprise a masking film which reflects light substantially uniformly over the visible portion of the spectrum.

9. A substantially colorless polymeric multilayered film having at least two major surfaces and which reflects a majority of at least two major surfaces and which reflects a majority of light in the infrared region of the spectrum while transmitting a majority of light in the visible region of the spectrum comprising, multiple alternating layers of first (A), second (B), and third (C) diverse substantially transparent polymeric materials which differ in refractive index by at least about 0.03, said layers having an optical thickness of between about 0.09 $\mu$m and 0.45 $\mu$m and each of said polymeric materials having a different index of refraction such that said film reflects light in the infrared portion of the spectrum, and means associated with said film for masking any iridescent visible color reflected from said layers such that there is an absence of visibly perceived color reflected from said film.

10. The substantially colorless polymeric multilayered film of claim 9 wherein said alternating layers of polymeric materials comprise polycarbonate and polymethylmethacrylate.

11. The substantially colorless polymeric multilayered film of claim 9 wherein said alternating layers of polymeric materials comprise polystyrene and polymethylmethacrylate.

12. The substantially colorless polymeric multilayered film of claim 9 wherein said color masking means is laminated to said film.

13. The substantially colorless polymeric multilayered film of claim 9 wherein said color masking means comprise a substantially colorless metal oxide or metal halide film having sufficient reflectance to mask the visible iridescent color effects of the infrared reflecting film.

14. The substantially colorless polymeric multilayered film of claim 13 wherein said color masking means is deposited on said film.

15. The substantially colorless polymeric multilayered film of claim 9 wherein said color masking means comprise a sufficient number of alternating layers of substantially transparent diverse polymeric materials, a substantial majority of said layers having an optical thickness of not less than 0.45 $\mu$m or not greater than 0.09 $\mu$m.

16. The substantially colorless polymeric multilayered film of claim 1 wherein said color masking means are located on one or both of said major surfaces of said body.

17. The substantially colorless polymeric multilayered film of claim 1 wherein said color masking means are located between interior layers of said body.

18. The substantially colorless polymeric multilayered film of claim 1 in which there is a layer thickness gradient across the thickness of said film.

19. The substantially colorless polymeric multilayered film of claim 17 in which said layer thicknesses increase monotonically across the thickness of said film.

20. The substantially colorless polymeric multilayered film of claim 1 in which at least 70% of said light in the visible region of the spectrum is transmitted through said film.

* * * * *